United States Patent
Pederson et al.

(10) Patent No.: US 6,671,687 B1
(45) Date of Patent: Dec. 30, 2003

(54) METHOD AND APPARATUS FOR PROTECTING DATA RETRIEVED FROM A DATABASE

(75) Inventors: Donald R. Pederson, San Diego, CA (US); Fred S. Kaufmann, Irvine, CA (US); Gregory H. Milby, San Marcos, CA (US)

(73) Assignee: NCR Corporation, Dayton, OH (US)

( * ) Notice: Subject to any disclaimer, the term of this patent is extended or adjusted under 35 U.S.C. 154(b) by 291 days.

(21) Appl. No.: 09/675,275

(22) Filed: Sep. 29, 2000

(51) Int. Cl.[7] .............................. G06F 17/30; G06F 7/00
(52) U.S. Cl. ............................................. 707/9; 707/10
(58) Field of Search ..................... 705/77, 40; 709/250, 709/225; 707/10, 104, 3, 9, 2, 6, 101; 395/186

(56) References Cited

U.S. PATENT DOCUMENTS

| | | | |
|---|---|---|---|
| 5,181,162 A | * | 1/1993 | Smith et al. ................. 715/530 |
| 5,931,917 A | * | 8/1999 | Nguyen et al. ............. 709/203 |
| 5,996,076 A | * | 11/1999 | Rowney et al. ............... 705/76 |
| 6,161,139 A | * | 12/2000 | Win et al. .................... 709/223 |
| 6,236,996 B1 | * | 5/2001 | Bapat et al. ..................... 707/9 |
| 6,356,905 B1 | * | 3/2002 | Gershman et al. ............ 705/26 |
| 6,405,203 B1 | * | 6/2002 | Collart ........................ 382/205 |

OTHER PUBLICATIONS

Peter Gulutzan & Trudy Pelzer, SQL–99 Complete, Really, pp. 35, 517–540 (1999).

* cited by examiner

*Primary Examiner*—Frantz Coby
*Assistant Examiner*—Merilyn Nguyen
(74) *Attorney, Agent, or Firm*—Trop, Pruner & Hu, P.C.

(57) ABSTRACT

A method and apparatus enables remote access of data of a database system. Such access may be performed by a remote device, such as a client computer system. A custom defined data type is assigned to data stored in the database system, the custom data type associates an access restriction to the data. A request for the data may be received over a communication network, such as the Internet or a local area network (LAN). In response to the request, the database system prepares the data for transmission and provides the requested information back over the communication network. The data is accessed using a security restriction defined by the custom data type.

24 Claims, 4 Drawing Sheets

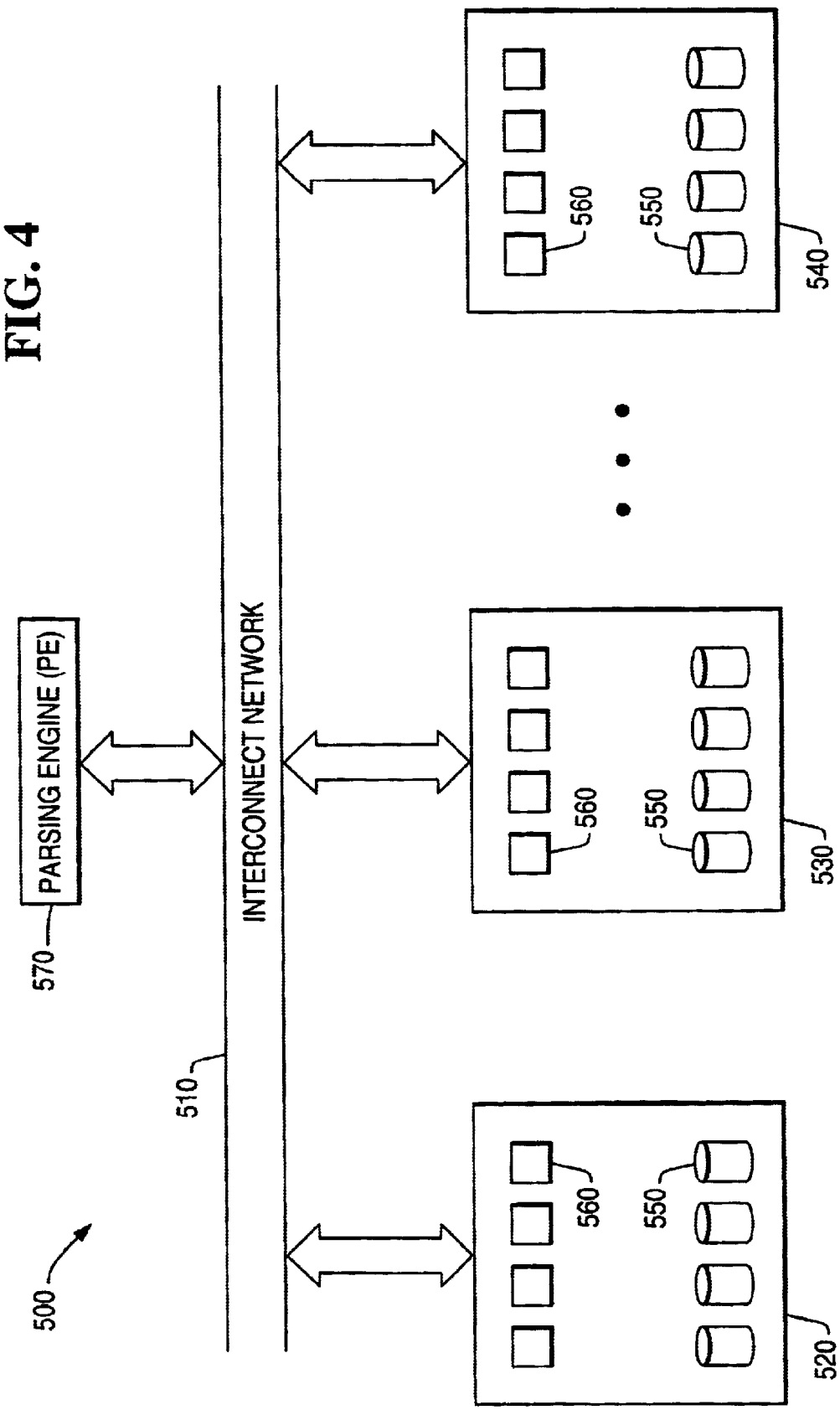

METHOD AND APPARATUS FOR PROTECTING DATA RETRIEVED FROM A DATABASE

TECHNICAL FIELD

The invention generally relates to storing, protecting, and accessing data.

BACKGROUND

One of the key advantages of storing large amounts of data in a database is that a specific subset of the stored data can be retrieved in an organized manner. Often, the subset of the stored data that is retrieved is analyzed to study various indications, such as economic trends, consumer reactions, and the like. To learn about customers, businesses are collecting various types of information about their customers, such as personal data, geographic/demographic data, purchasing habits, and so forth. Such customer data are stored in a database system, such as in a relational database management system (RDBMS), where the data can be processed and sorted into a format suitable for reporting or analysis. An example of a database system in which such information is collected is a data warehouse in which data is input from a variety of sources and organized into a format that is structured for query and analysis or reporting. The volume of data collected in a large data warehouse is typically in the gigabyte and sometimes in the terabyte or higher range.

To handle the massive amount of data that is collected and processed in such data warehouses, sophisticated platforms are typically employed. The platforms include parallel processing systems, such as massive parallel processing (MPP) systems or symmetric multiprocessing (SMP) systems. An MPP system typically is a multi-node system having a plurality of physical nodes interconnected by a network. An SMP system typically is a single-node system having multiple processors. Collected data is stored in storage devices in such systems, which are accessible by the various nodes or processors to perform processing. In a parallel system, stored data portions are accessible in parallel to increase access speeds.

Many times, data from a storage database is extracted for consumer profiling. For example, using records of retail transactions of a customer, a consumer profile that includes spending habits can be created. The spending habits in the consumer profile can include the types of goods acquired and the method of payments, such as the types and numbers of credit cards used. It is generally desirable to restrict access to such sensitive data to reduce the possibility of fraud. Sensitive data that contain credit card information may be communicated between a database and a number of client computer systems that may be remotely located; therefore, measures to secure the data is important.

Presently, access to sensitive data, such as credit card information, stored in a relational database is restricted using constraints in the user interface that is used to view the data. While these constraints protect against unauthorized access through such a user interface, they do not prevent unauthorized parties from intercepting the data transmission, such as from a server computer system to a client computer system. Further more, the present methods do not prevent sensitive data from being intercepted by field personnel who are analyzing computer crash dump data. Simply encrypting the sensitive data can protect against this type of unauthorized access, however, it also introduces an exorbitant amount of processing overhead when complex comparisons or aggregations are performed on the data.

SUMMARY

In general, according to one embodiment, a method of presenting information relating to a database system is provided. A custom defined data type is assigned to data stored in the database system, the custom data type associating an access restriction to the data. A request for the data in the database system is received. The data for transmission is prepared in response to the request for data, based on the access restriction. The data is sent to a remote device over a network connection.

In general, in accordance with another embodiment, an apparatus for presenting information relating to a database system is provided. The apparatus of the present invention comprises: a first database; an interface to a network connection; and a first database controller coupled to the first database, wherein the first database controller is capable of performing a user-defined type security protocol to protect data stored in the first database and to transmit the data over the network connection, the user-defined type security protocol identifying an access restriction associated with a defined data type.

Other features and embodiments will become apparent from the following description, from the drawings, and from the claims.

BRIEF DESCRIPTION OF THE DRAWINGS

The invention may be understood by reference to the following description taken in conjunction with the accompanying drawings, in which like reference numerals identify like elements, and in which:

FIG. 4 illustrates one embodiment of the database that can be used in the communication system of FIGS. 2 and 3;

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Generally, when data is transmitted from one device to another, such as from a server system to a client system, a certain amount of security to protect the data is desired. Often, sensitive data is transmitted from one computer system to another, requiring security measures that protect the data from unauthorized access. Embodiments of systems used to protect data communicated between devices are discussed below.

Figure 1:
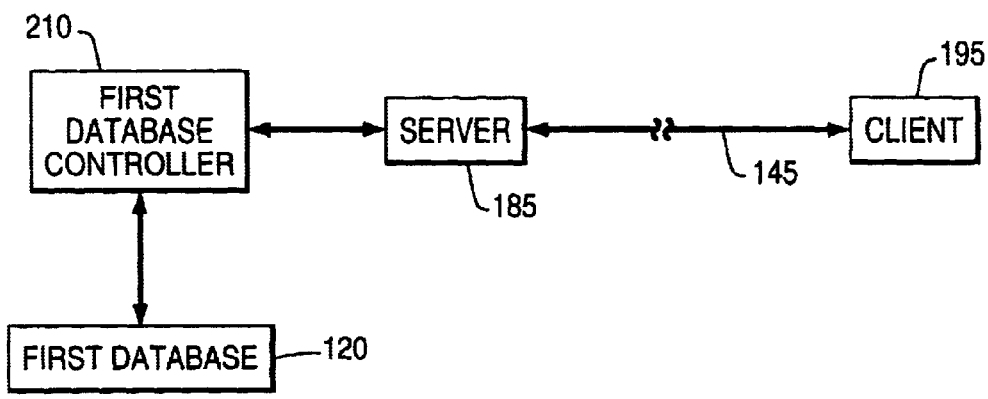
FIG. 1 is a block diagram of an example database communications system, including database controllers, in accordance with an embodiment of the present invention.

Turning now to FIG. 1, a system, which comprises a first database 120, a first database controller 210, and a server 185, in accordance with one arrangement of the present invention, is illustrated. In one embodiment, the first database controller 210 is capable of collecting requested or queried data from the first database 120 in response to requests or queries from a client 195. In one arrangement, the first database controller 210 includes an interface that facilitates communication on a network connection 145. The system described in FIG. 1 is capable of facilitating communications of data that is organized in a secure manner, from one database to another, or from one database to a client 195. In one embodiment, the system of FIG. 1 promotes data security by assigning a user-defined data type, or a custom data type, to protected data and restricting access to the data by the use of methods.

In the illustrated embodiment, the server 185 receives requests from the client 195. The requests, which in one example are Hypertext Transfer Protocol (HTTP) requests, are translated to a format that can be understood by the database controller 210, which in turn issues queries, such as Structured Query Language (SQL) queries, to the database 120. In another arrangement, the client 195 is coupled directly to the database controller 210 without going through the server 185.

In one embodiment, network-connection 145 is typically either a private network connection or a public network connection, or a combination of both. Examples of the network connection 145 include communication networks, channels, links, or paths, and systems or devices (such as routers) used to route data over such networks, channels, links, or paths. A private network connection 145 typically includes a mainframe computer access and local area networks (LANs) or wide area networks (WANs), while one example of a public network connection is the Internet. The types of devices or systems that have access to the communication networks include both wired and wireless devices or systems. Examples of wired devices include personal desktop computer systems that have access to the network connection 145 through dial-up services or other types of data network connection services. Wireless devices. (e.g., portable computers with wireless modems, personal digital assistants, mobile telephones) have access to the network connection 145 over wireless infrastructures.

Figure 2:
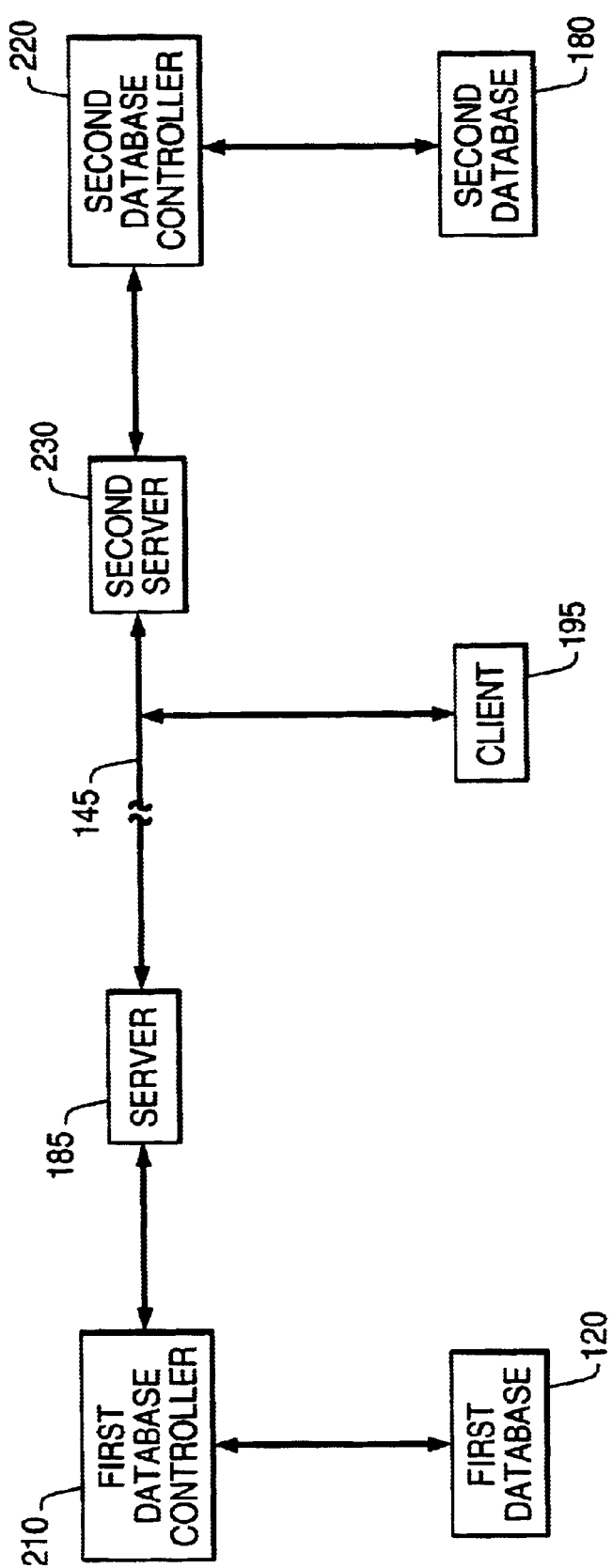
FIG. 2 illustrates an alternative depiction of the database communications system, including database controllers, of FIG. 1.

Turning now to FIG. 2, another embodiment of the system includes a second database controller 220, a second database 180, and a second server 230. The client 195 can be used to send a request to the server 185 to extract a set of data that is organized, compared, or queried, from the first database 120, with the extracted data sent to the second database 180. In response to a request, the server 185 collects data from the first database 120 and performs security functions in accordance with the present invention, with the collected data sent to the second database 180, via the second server 230 and the second database controller 220.

Figure 3:
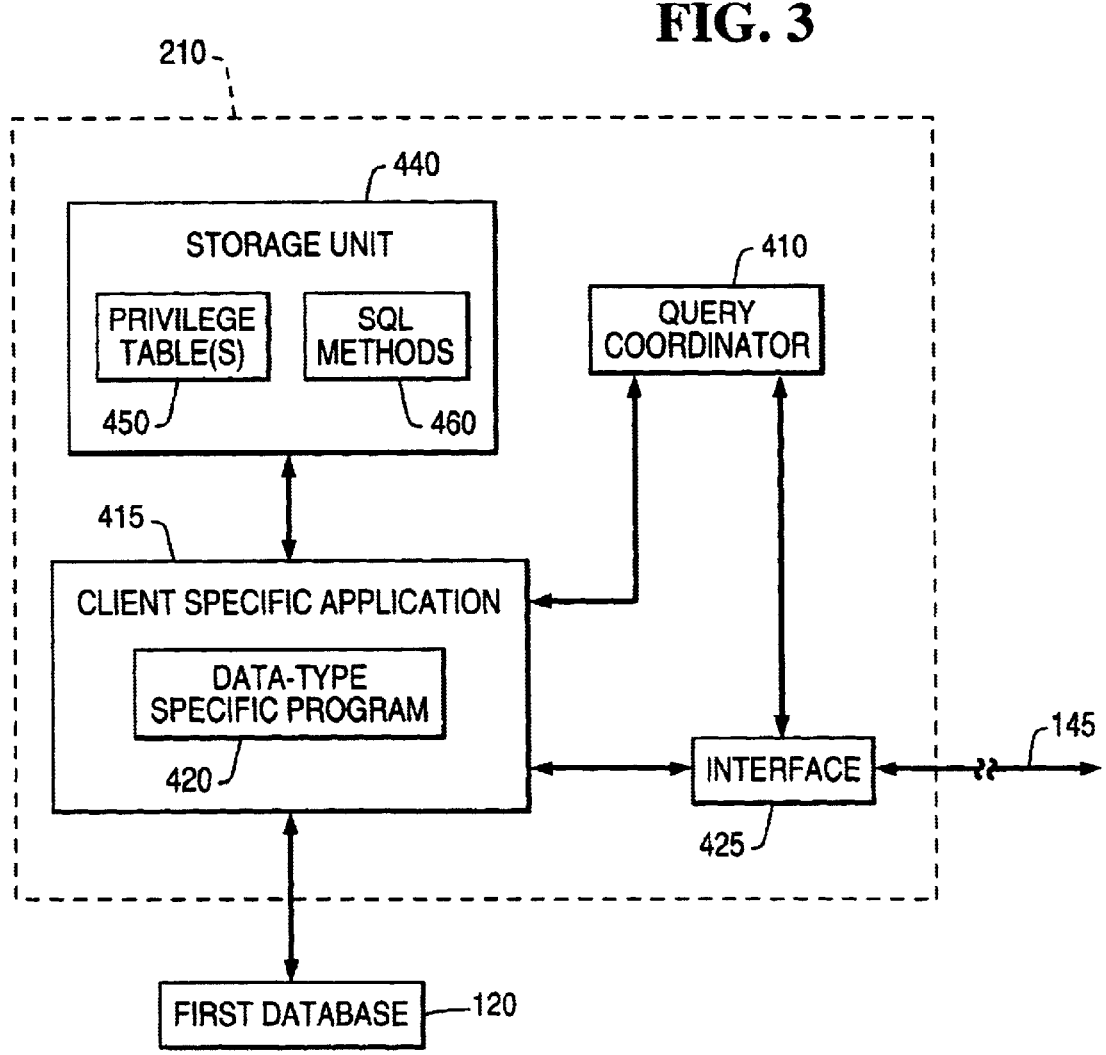
FIG. 3 illustrates a more detailed depiction of one embodiment of the database controllers illustrated in FIGS. 1 and 2.

Turning now to FIG. 3, a more detailed depiction of one embodiment of the first database controller 210 is illustrated. The first database controller 210 includes a query coordinator 410, a client specific application 415, an interface 425, and a storage unit 440. The query coordinator 410 locates the data in the first database 120, queried by the client 195, and determines a data-type of the queried data. The client specific application 415 includes a data-type specific program 420, which is executed to control access to certain types of protected data in the database 120. In one embodiment the data-type specific program 420 places at least one restriction upon the data, wherein access to view the data by the client 195 can be controlled. For example, the data extracted from the first database 120 may have a data-type that is defined to be credit card data-type. A set of predetermined restrictions can be placed upon the credit-card data-type, such as restrictions on viewing the data. Using data-type attributes, a credit card number can be used as an identifier to retrieve a set of data from the first database 120, but the credit card number itself can be kept secure by restricting viewing of the credit card number.

In one embodiment, the data-type specific program 420 is a JAVA program. Alternatively, the data type specific program 420 can also be computer programs written in other programming languages. The data-type specific program 420 is used to create a user-defined type (UDT) to store and access a certain type of data, such as credit card numbers. The client specific application 415 is capable of encrypting the queried data. The data requested by the client 195 may be sent by the interface 425, via the network interface 145, to the client 195 or to the second server 220 for storage into the second database 180. The second database controller 220 and the client 195 are capable of decrypting the queried data. In one embodiment, methods or functions can be used to restrict what is viewed by a user. For example, methods or functions can be used to block out an entire credit card number or block out all numbers except the last four digits, but still allow a user to view other details associated with the credit card number, such as the spending habits of a person using a credit card that is being analyzed.

The storage unit 440 in the first database controller 210 stores one or more privilege tables 450 and methods 460. The privilege table 450 contains predetermined privilege information that is used by the client specific application 415 to restrict access to data. The methods 460 comprise predefined methods that are called by the client specific application 415 to implement restriction of access to data. The client specific application 415 is capable of checking the privilege table 450 to determine the type of privilege to attach to data from the first database 120. Therefore, access to data from the first database 120 can be secured by using the predetermined privilege definitions stored in the privilege table 450.

The client specific application 415 is also capable of accessing the methods 460 stored in the storage unit 440 to execute various methods to implement restrictions to the data from the first database 120. In one arrangement, in response to requests from the client 195, the client specific application 415 uses the methods 460 in queries, such as SQL queries, to the database 120.

Turning now to FIG. 4, one embodiment of a database system 500 is illustrated. The illustrated database system 500 is one example of the database system made up of the database 120 and the database controller 210. In the illustrated embodiment, the database system 500 is a multi-node parallel system that has a plurality of nodes 520, 530, 540 coupled by an interconnect network 510. The database system 500 also comprises a parsing engine 570, which is capable of parsing data from the plurality of nodes 520, 530, 540. In an alternative embodiment, the database system 500 comprises the first database controller 210 and the first database 120. In yet another alternative embodiment, the database system 500 comprises the first database controller 210, the first database 120, and the server 185. Each node 520, 530, 540 comprises one or more storage devices 550 and at least one memory storage controller 560. The arrangement of FIG. 4 is an example of a parallel database system. In further embodiments, other types of arrangements can be employed, such as single-node systems.

Figure 5:
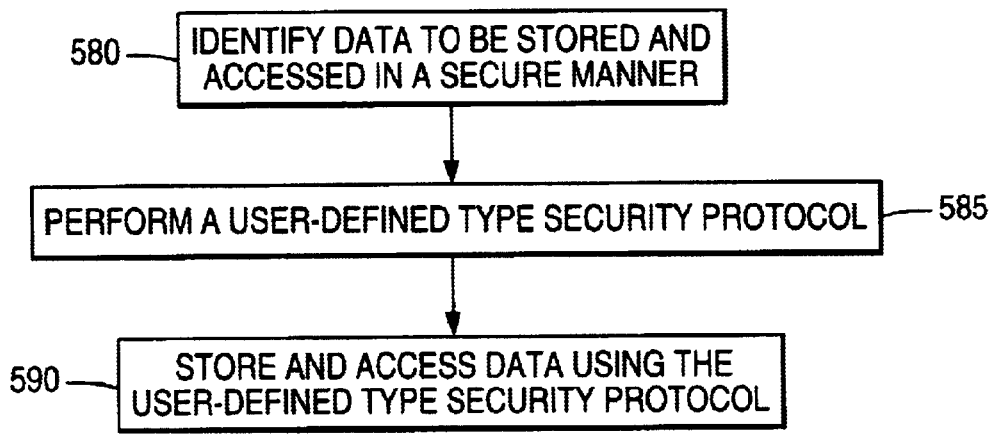
FIG. 5 illustrates a flowchart depiction of one embodiment of the methods facilitating data communications using user-defined types.

Turning now to FIG. 5, the first database controller 210 identifies a set of data that is to be stored and accessed in a secure manner (step 580). In one embodiment, this data includes credit card numbers and corresponding transactions. Once a set of data to be stored and accessed in a secure manner is identified, the first database controller 210 performs a user-defined data type security protocol on the data (step 585). The data is then accessed by the client 195 after being decrypted (step 590).

Figure 6:
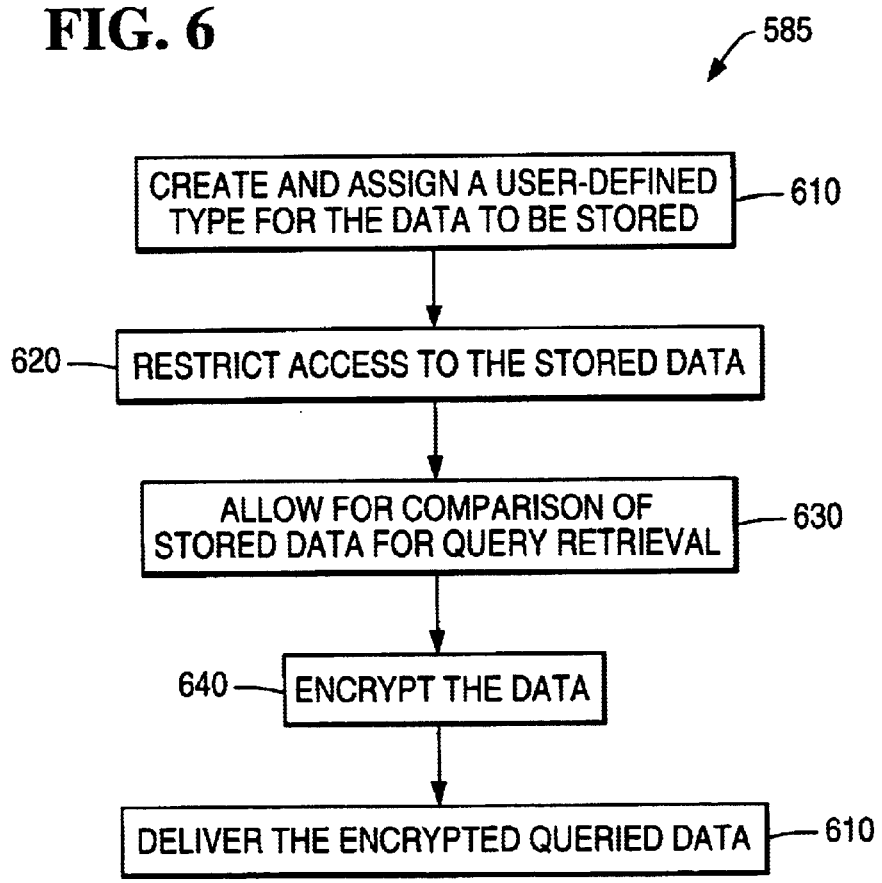
FIG. 6 illustrates a more detailed depiction of one embodiment of performing user-defined type security protocol described in FIG. 5.

FIG. 6 shows one technique for use in performing a user-defined data type security protocol. First, a user-defined data type is created and assigned for the data requiring security by the first database controller 210 (step 610). In one embodiment, creating and assigning the user-defined data type is performed by the first database controller 210 up on the data in the first database 120. One example of a user-defined data type is a credit card type associated with a predetermined field of characters. As an illustrative example, the following function is used to assign a credit card data type associated with a data field.

CREATE TYPE Credit_Card Type AS
(CC_Num_Private DECIMAL(30) ) Data containing the credit card number is stored in the data field CC_Num_Private. Access to the stored data is restricted by the first database controller 210 (step 620). This provides the capability of setting a predetermined access privilege within the data type (e.g. credit card data type). The attribute CC_Num_Private is not viewable without further execution of pre-defined methods. Predetermined privileges to view the data can be granted based upon particular methods. In one embodiment, privileges in the client 195 can be established such that credit card data can only be deciphered only by executing a method in the client 195. As an example of the privileges described above, if a user has privilege to view the type of credit card data, the following method may be used to access the credit card data type.

METHOD Credit_Card_Type (CC Num DECIMAL (30))
RETURNS Credit_Card_Type
The following method can be used to allow authorized users to view the restricted credit card number data.
METHOD Number ( )
RETURNS DECIMAL (30).

Authorized users of the client computer system 195 can view the credit card numbers using the method "Number." Further restrictions can be invoked to allow for varying degrees of access to the restricted; data. For example, some users can be given the authorization to view the last four digits of a credit card number for market analysis, such as by using the method below.
METHOD Last4 ( )
RETURNS DECIMAL (4).

The first database controller 210 also provides methods to allow for comparison of the stored credit card data for query retrieval (step 630). For example, comparisons of credit card numbers throughout several transactions can be made to determine the number of transactions that involve a particular credit card. The following methods facilitate comparison of one credit card number with another, which can be implemented in SQL queries:
METHOD Compare (CC_Num DECIMAL(30))
RETURNS BOOLEAN;
METHOD Compare (CC Credit_Card_Type)
RETURNS BOOLEAN.
Using the "Compare" methods described above, although a credit card number can be employed in queries to the database, access to the credit card number itself is not provided (unless one of the methods discussed earlier is used).

An illustrative example based upon the methods above is provided below. The following example illustrates a routine for creating a sales table that tabulates items sold and the corresponding credit card used for the sale.

```
CREATE TABLE SalesTable
(
    SalesDate      DATE
    ItemNo         INTEGER
    Credit_Card    Credit_Card_Type
)
```

The following SQL statement allows a user to view the credit card number entry contents of the sales table if the user has access rights to the "Number" method.
SELECT Credit_Card.Number( ) FROM SalesTable
If a user who does not have access to the "Number" method attempts to view the content of the sales table using the SQL statement above, an "access right violation" error is returned. The following statement allows a user to tabulate items sold to an individual yesterday and today.

```
SELECT   ItemNo FROM SalesTable SalesToday, SalesTable
         SalesYesterday
WHERE    SalesToday.SalesDate = DATE
AND      SalesYesterday.SalesDate = DATE-1
AND      SalesToday.ItemNo = SalesYesterday.ItemNo
AND      SalesToday.Credit_Card.Compare (SalesYesterday.Credit_
         Card)
```

The execution of the above statement is performed in the first database controller 210. In an alternative embodiment, the above statement may be performed in the client 195, or further alternatively, in the second database controller 220. The above statement tabulates items sold to an individual as well as the credit card number used for the transaction. The "Compare" method is used to compare the credit card number used in the transactions and returns a message indicating whether there is a credit card match. In other words, the "Compare" method will notify a user whether the same credit card was used by an individual for multiple transactions.

In one embodiment, security requirements for the data transactions (e.g. data transfer from the first database 120 to the client 195) can be defined in the first database 120. Therefore, security restrictions defined by the first database controller 210 is applied to the data in the first database 120. For added security, the data stored in the first database 120 is encrypted for transmission from the first database controller 210 to a remote device, such as the client 195 (step 640). In one embodiment, the encryption is performed after the data comparison functions are completed. In one embodiment, pre-defined methods can be used to perform public-private key encryption. Generally, using public-private key encryption, information is encrypted using a public key, and at the receiving end, the data is decrypted using a private key.

The client specific application 415 contains the public key of the server 185. The client specific application 415 utilizes the public key to encrypt the credit card number data before sending it to the server 185 for a query. A remote device, such as the client 195, sends its public key to the server 185. The public key is used to encrypt the credit card data before data is sent to the client 195. This allows for secure transfer of the credit card number data from the server 185, which is coupled to the first database 120, to the client 195, or to the second database 180 via the second database controller 220. Communications in the reverse direction (i.e., from the client 185 to the server 195) can also be made secure using the methods described above. The methods defined below, which in one embodiment are executed by the first database controller 210, are used to perform data encryption and decryption and to access encrypted data.

---

CREATE TYPE Credit_Card_Type AS
   ( CC_Num_Private DECIMAL (30)
     Encrypted BOOLEAN )
METHOD Credit_Card_Type ( Encrypted_CC_Num VARBYTE (255) )
     RETURNS Credit_Card_Type
METHOD Encrypt ( CC_Num DECIMAL (30), Key VARBYTE (255) )
   RETURNS VARBYTE (255)
   METHOD DECRYPT ( Encrypted_CC_Num VARBYTE (255), Key VARBYTE (255) )
     RETURNS CC-Num DECIMAL (30)
   METHOD Number ( Key VARBYTE (255) )
     RETURNS DECIMAL (30)

---

The method "Encrypt" and the method "Decrypt" are called by the client specific application 415 in the first database controller 210. The client specific application 415 calls the method "Encrypt" with the public key of the server 185 to encrypt the credit card number data. In one embodiment, the client specific application 415 passes the encrypted credit card number data to the client 195. In an alternative embodiment, the client specific:, application 415 passes the encrypted credit card number data to the second database controller 220. The encrypted credit card data is decrypted, by the client 195 or the second database controller 220, using the private key of the client 195, which is private to the client computer system 195 or to the second database controller 220.

Once the data that is to be transmitted is encrypted, the server 185 transmits the encrypted data from the first database 120 to a remote device, such as the client 195 (step 650). The completion of the step of transmitting the encrypted data, substantially completes the act of performing a user-defined type security protocol that is indicated in step 585 in FIG. 5.

Providing transmittal security enables access to the data by third party tools that do not have the company-specific or data-specific security code built in. The transmittal security requirements are defined in the database and implemented in the standard Application Program Interfaces (APIs) that third party tolls use. For example, using the user-defined type security protocol described above, one could implement a security policy that requires all credit card numbers to be encrypted with a 128-bit encryption algorithm. Generally, with this restriction, the data queries that call for a credit card number to be returned would be subjected to an application that is local to the database server 185. In one embodiment, the local application would encrypt the credit card number and transmit the encrypted data. The credit card number would be then be decrypted on the receiving side (e.g. the client 195) by another application. This causes the implementation of standard third party tools and data-query or data-mining tools on these data types, to be difficult. However, using the user-defined type security protocol described above, the data is defined in database data-type definition. Therefore, the transmittal security is handled before the data is accessed by the third party tools. Thus, third party tools can be used to access secure data types directly without having other security policies encoded into the third party tools.

Using the user-defined type security protocol described above, additional data security can be realized. Generally, when only the data type is encrypted, unauthorized decryption of the data is more difficult. In many cases, encryption-breaking methods include attempting to decrypt unauthorized data by using decryption keys that produce some readable characters. When an entire data transmission is encrypted, additional information, such as names are included in the encrypted data. Unauthorized attempts to decrypt the data may include using decryption keys until a name is deciphered. In one embodiment, using the user-defined type security protocol described above,1only the credit card number would be encrypted. Therefore, there would be no ASCII text that a person attempting an unauthorized decryption can use. Generally, users implement a full message encryption scheme for messages transmitted on a public network, such as the Internet. Since full-message encrypted data generally contain text, they are easier to decrypt. However, if only portions of a transmitted message (i.e. specific data types such as credit card numbers) are encrypted, an unauthorized user will find it more difficult to decrypt those portions.

Turning back to FIG. 5, the client 195 stores the encrypted data. In an alternative embodiment, the second database controller 220 stores the encrypted data. The data can be accessed by the client 195 after the data is decrypted (step 590). In one embodiment, the data is stored in an encrypted format on a storage medium (e.g. storage disk) in the second database 180, which provides security that is in addition to the security provided by the use of user-defined types and methods.

If requested by an authorized user, the first database controller 210 uses the "Number" method to retrieve a credit card number. The "Number" method, which is executed in the first database controller 210, decrypts the credit card number data using the "Decrypt" method and the server's private encryption key. The first database controller 210 re-encrypts the data using the "Encrypt" method with the public encryption key supplied by the client 195. The first database controller 210 then sends the requested data to the client 195, or in an alternative embodiment, to the second database controller 220, in an encrypted format. Generally, the encrypted requested data is decrypted using the client's private encryption key with the "Decrypt" method and the private encryption key of the client 195.

When used for encrypted data, the "Compare" method checks the state of the Encrypted flag. If true, the "Compare" method decrypts the credit card number data using the "Decrypt" method and the server's private encryption key before performing a comparison. This will allow the first database controller 210 to perform joins, aggregates, etc. using the credit card number data, without making it visible to the client 195.

Utilization of public key encryption with the methods described above can allow third party applications and users to send, store, and receive data, such as credit card numbers, in a secure manner. Use of the various methods described above allows easier implementation of the security measures discussed above. Further, the same methods are accessible by various devices in the system.

The various devices and systems discussed each includes various software layers, routines, or modules. Such software layers, routines, or modules are executable on corresponding control units. The various control units in the devices or systems may each include a microprocessor, a microcontroller, a processor card (including one or more microprocessors or microcontrollers), or other control or computing devices. As used here, a "controller" refers to a hardware component, software component, or a combination of the two.

The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various, software routines, modules, or layers in the various devices or systems may be stored in respective storage devices. The instructions when executed by a respective control unit cause the corresponding device or system to perform programmed acts.

The instructions of the software routines, modules, or layers may be loaded or transported to each device or system in one of many different ways. For example, code segments including instructions stored on floppy disks, CD or DVD media, a hard disk, or transported through a network interface card, modem, or other interface device may be loaded into the device or system and executed as corresponding software routines, modules, or layers. In the loading or transport process, data signals that are embodied in carrier waves (transmitted over telephone lines, network lines, wireless links, cables, and the like) may communicate the code segments, including instructions, to the device or system. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method for use in a database system, comprising: assigning a user-defined data type to data stored in the database system, the user-defined data type defining an access restriction to the data;
   receiving a request for the data according to the user-defined data type in the database system;
   invoking a method associated with the user-defined data type to access the data wherein the method is accessible only by one or more authorized users; and
   preparing the data for transmission in response to the request for data, based on the access restriction.

2. The method of claim 1, wherein receiving the request for data comprises receiving a Structured Query Language query.

3. The method of claim 1, wherein receiving the request comprises receiving a query for credit card information.

4. The method of claim 1, further comprising performing comparison of the restricted data in response to the request for data.

5. The method of claim 4, wherein performing the comparison comprises using a method associated with the user-defined data type to perform the comparison of the data.

6. The method of claim 1, further comprising encrypting the data prior to transmission.

7. The method of claim 6, wherein encrypting the data comprises using a method associated with the user-defined data type to encrypt the data.

8. The method of claim 7, wherein encrypting the data comprises performing a public-private key encryption.

9. A system comprising: a first database; and
   a first database controller coupled to the first database, wherein the first database controller is adapted to provide a security protocol defined by a user-defined data type to protect data according to the user-defined data type stored in the first database, the security protocol defining an access restriction.

10. The system of claim 9, wherein the first database is a parallel database system.

11. The system of claim 9, wherein the first database controller further comprises:
    a query coordinator to receive query requests; and
    a client specific application coupled to the query coordinator to access data selected by the query coordinator using the security protocol.

12. The system of claim 11, the query coordinator to direct the client specific application to retrieve data from the first database in response to a data query.

13. The system of claim 11, the client specific application to create the user-defined data type.

14. The system of claim 9, further comprising at least one method associated with the user-defined data type to access the data using the security protocol.

15. The system of claim 9, wherein the data stored in the first database comprises credit card information.

16. The system of claim 15, wherein the credit card information is assigned a secured data type according to the user-defined data type.

17. An article comprising one or more storage media containing instructions that when executed cause a device to:
    store data in a database system, at least a portion of the stored data being according to a first user-defined data type;
    restrict access to the data portion based upon security provided by the first user-defined data type;
    enable a database operation using the data portion; without enabling access to the data portion; and
    invoke a method associated with the user-defined data type to access the data portion, the method associated with a privilege level.

18. The article of claim 17, wherein the instructions when executed cause the device to assign one or more authorized entities, based on the privilege level and ability to use the method.

19. The method of claim 1, further comprising determining whether access to the data is allowed based on the access restriction provided by the user-defined data type.

20. The method of claim 1, further comprising receiving a statement to create the user-defined data type in the database system.

21. The method of claim 20, wherein receiving the statement comprises receiving a Structured Query Language statement.

22. The system of claim 9, the first database controller to create the user-defined data type in response to a Structured Query Language statement.

23. The article of claim 17, wherein the instructions when executed cause the device to create the user-defined data type in response to a statement.

24. The article of claim 23, wherein the instructions when executed cause the device to create the user-defined data type in response to a Structured Query Language statement.

* * * * *